R. B. STRINGFIELD.
RECOVERY OF SOLUBLES FROM FLUE DUST.
APPLICATION FILED DEC. 7, 1917.

1,345,034.

Patented June 29, 1920.

Inventor
Raymond B. Stringfield
By Arthur P. Knight
Attorney

UNITED STATES PATENT OFFICE.

RAYMOND B. STRINGFIELD, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

RECOVERY OF SOLUBLES FROM FLUE-DUST.

1,345,034. Specification of Letters Patent. Patented June 29, 1920.

Application filed December 7, 1917. Serial No. 206,122.

*To all whom it may concern:*

Be it known that I, RAYMOND B. STRINGFIELD, a citizen of the United States, residing at Los Angeles, in the county of Los Angeles and State of California, have invented a new and useful Improvement in Recovery of Solubles from Flue-Dust, of which the following is a specification.

This invention relates particularly to the recovery of potassium compound from flue dust—for example, from dust or fumes coming from cement kilns and containing potassium compound in appreciable quantity. Such dust or fume is now successfully recovered, for example, by electrical precipitation, and the recovery of the potassium compound content thereof is of considerable commercial importance. Such dust contains considerable amounts of other ingredients than potassium compound, rendering it usually desirable to treat the same, in order to concentrate the potassium compound and to produce from the dust, a solution of potassium salt or salts and an insoluble or substantially insoluble residue containing little or no potassium compound. In the case of cement kiln flue dust, there is always considerable calcium compound present together with the potassium compound, and in general, a considerable proportion of the potassium compound present is in the form of sulfate.

In the ordinary process of extracting potassium compound from flue dust containing potassium sulfate and calcium compound, by leaching the dust with either cold or warm water and, after filtration, and concentrating the resulting solution, it is found that a portion of the potassium salts present may remain in the leached residue or filter press cakes, even after washing, which phenomena is attributed to the formation of a relatively insoluble double sulfate having the formula $CaSO_4.K_2SO_4.H_2O$, causing consequent loss of potassium compound and low extraction.

It has been attempted to overcome this difficulty by using, in leaching the flue dust, water at a temperature approaching 100° C., such temperature being maintained during both leaching and filtration, in order to prevent the formation of this relatively insoluble double salt. Such a process is, however, open to the objection, that the production and maintenance of such high temperature, involves considerable expense; is destructive on the apparatus, particularly the filtration devices; and interferes with the production of an effective suction in the filter.

The main object of the present invention is to provide for successful leaching or extraction of the potassium compound from such flue dust in such manner as to avoid any loss due to formation of such double salt of potassium and calcium, and at the same time, to provide for the use of moderate temperatures in extraction and filtration, thereby rendering the process more practicable and economical than where relatively high temperatures are used.

Another object of the present invention is to provide for extraction and separation of potassium compound in the most rapid and economical manner by providing for production of a substantially saturated solution of potassium compound in the leaching operation, and at the same time, avoiding the difficulties ordinarily arising from the production of such saturated solution.

My process may be carried out in any suitable form of apparatus, for example, in forms shown in accompanying drawings, wherein—

Figure 1:
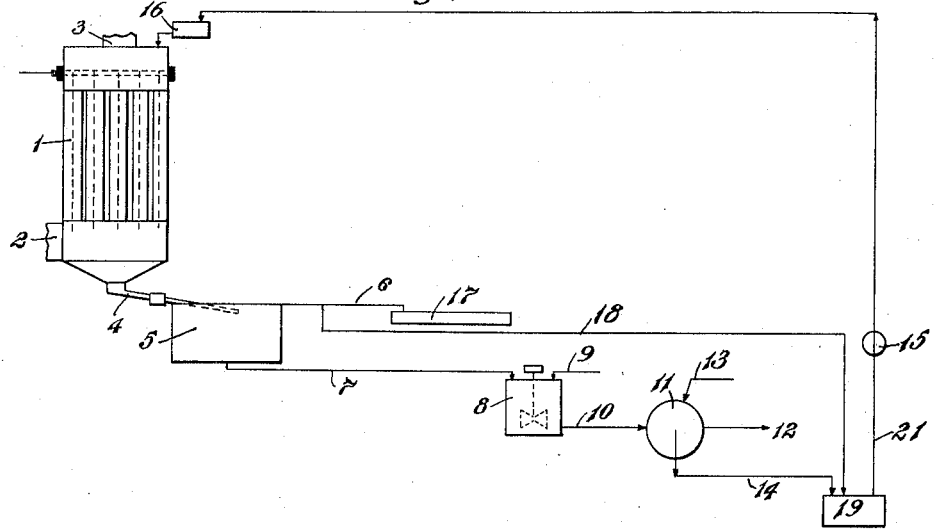
Figure 1 is a flow sheet of one form of such apparatus embodying filtration as one of the steps in extraction.

The apparatus shown in Fig. 1 comprises a leaching means 1, preferably constituted by an electrical precipitator of the type wherein the fume or dust is precipitated, by electrical action, into streams of water or dilute solution running down on vertically arranged collecting electrodes. Any other suitable apparatus, however, may be used for bringing the fume or dust into contact with water or dilute solution for dissolving the solubles therein. In general, the cement kiln dust or other dust or fumes, which it is desired to treat, contains potassium compound, partly or wholly in form of sulfate, together with calcium compound, and I will describe my invention as particularly applied in connection with such fumes or dust. In the solution of the solubles in such fumes or dust, it is desirable to apply more or less heat to the material during the leaching operation. In the case of an electrical precipitator used as a combined leaching and precipitating apparatus, the requisite heat will, in general, be furnished by the kiln gases which carry the fume or dust, and which enter the apparatus 1 at inlet indicated at 2 and leave the same at outlet indicated at 3, said gases being generally at high temperature. From the apparatus 1, all of the collected material, such as fume or dust, together with the leaching liquid supplied to the apparatus 1, passes through connection 4, to a suitable decantation or dewatering apparatus such as a thickener 5 of any ordinary type. (Such as a Dorr thickener). The decanted clear liquid or overflow from this thickener passes off through outlet 6 to any suitable means for recovering the solubles therefrom, for example, tanks for separating potassium compound by cooling, with resultant crystallization, or tanks or pans 17 for evaporating the solution to dryness. A connection 18 may also lead from outlet 6 to a sump 19. The leaching is so carried out in the apparatus 1 that a substantially saturated solution of potassium sulfate—say, equivalent to about 4 per cent. calculated as $K_2O$—is produced and the decanted liquid is of this same concentration so that it is in the most available condition for economical recovery of the potassium compound, either by crystallization or by evaporation to dryness.

I prefer to carry on the leaching operation and the thickening operation at a temperature not in excess of 80° C. and preferably in the neighborhood of 50° C., as such a temperature is most easily maintained and does not require special application of heat, or special means for retaining the heat in the solution. At such temperatures, and with the concentration of potassium sulfate stated, there is, in general, a tendency to formation of the insoluble double salt above referred to, said salt collecting along with the other insoluble material or sludge at the bottom of the thickener and being drawn off with this sludge through outlet connection 7, to suitable receiving means such as agitator 8. Water or dilute solution of potassium compound is added to this agitator through a suitable connection indicated at 9. The outlet pipe 10 of the agitator 8 leads to suitable filter means 11—preferably a continuous filter of any of the well known types, adapted for filtration and washing under suction. The insolubles are removed continuously from the filter in the usual manner and conveyed away at 12 by suitable conveying means, and the wash water which is supplied at 13, passes with the remainder of the solution from the filter through an outlet connection 14 to a suitable receiving means, or sump 19, being preferably conducted back from said sump by suitable pump means 15 and piping 21, to inlet means 16, for supplying liquid to the leaching apparatus 1.

In the general art and practice of potassium compound recovery by leaching cement plant flue dust, it has been the practice in this, as well as in other lixiviation processes, to bring the extracted solution to the highest possible concentration of the desired salt during the lixiviation process, in order to permit either the separation by fractional crystallization on cooling, or to reduce the cost of evaporation where the entire dissolved salt is recovered by the evaporation process.

It has been found that in leaching cement plant flue dust containing substantially no chlorids, efficient extraction of the $K_2SO_4$ content ceases when the solution has reached a potassium compound concentration slightly in excess of 4% calculated as $K_2O$, and at this concentration and temperature, under 85°, the double salt of $CaSO_4, K_2SO_4, H_2O$ may form and separate out in solid form, with considerable rapidity and in considerable amount, interfering with the economic recovery of the potassium compound contained in the dust.

I have found that the presence of large quantities of $CaSO_4, K_2SO_4, H_2O$ crystals in a pulp, because of their special crystal form (needle-like and in clusters of pure salt, much resembling glass wool in aspect) create most unfavorable conditions for filtration. The $CaSO_4, K_2SO_4, H_2O$ crystals apparently tie the solids together to form a mass, which handles on the filter almost like a colloidal precipitate, rendering difficult the proper separation of solid and solution by filtration, and adding greatly to the difficulties of proper washing.

Investigation has shown that the formation of this insoluble double salt $CaSO_4, K_2SO_4, H_2O$ may be completely prevented at temperatures below 85° by lowering the potassium compound concentration so as to fall to or below approximately the following temperature concentration ratios (the potassium being calculated as $K_2O$):

$1\frac{3}{4}\%$ $K_2O$ at 25° C.
2 % $K_2O$ at 32° C.
3.1% $K_2O$ at 80° C.

My present process is based on the utilization of this fact that the formation and separation of this insoluble double salt may be prevented by suitably reducing the concentration of potassium salt at a certain stage in the extraction, this being effected in such manner as not to reduce the concentration of the solution utilized for production by evaporation or crystallization of the potassium compound. For this purpose, I carry out the extracting process in such manner that a concentrated solution of the required compound is obtained at any desired range of temperature convenient for practical operation—say from 25° C. to 80° C., the solution being drawn off for treatment and the sludge is then treated with an additional quantity of water or dilute solution in such manner as to reduce the potassium compound concentration sufficiently to cause breaking up of any of the double salt referred to, which may have been formed, with the result that the potassium compound is restored to the solution, which may then be removed from the insoluble material by filtration or otherwise, and the potassium compound obtained therefrom in any suitable manner. In practice, I prefer to return the dilute solution so obtained, to the leaching stage of the process, for cyclic operation.

My process is preferably carried out as follows:

The dust containing potassium compounds is leached in apparatus 1, at moderate and economical temperature range—say, between 50 and 75° C., thus securing a solution containing substantially 4% potassium compound calculated as $K_2O$, passing all the solution with insolubles carried thereby, to the thickener 5, wherein the insolubles settle out; decanting the supernatant sulfate solution of substantially 4% strength calculated as $K_2O$ solution, and passing said solution in part or in whole, through outlet 6 to evaporators or crystallizing tanks or pans. The settled sludge consists of from 1 to 2 parts of solution of approximately 4% $K_2O$ content, to 1 of solids by weight; and may hold a considerable amount (dependent in part, upon length of contact of solvent and flue dust, and in part, upon potassium compound concentration), of potassium compound as the double salt $CaSO_4,K_2SO_4,H_2O$. This sludge is then passed to an agitating tank into which fresh water or a more dilute potassium compound bearing solution is added in such amount, and either hot or cold, that the total $K_2O$ concentration of the agitator pulp is 3%, or preferably under, if the temperature is 80°; 2%, or preferably under, if the temperature is approximately 30°, and in a proportional ratio for any temperature between these two, or below 30° C., with the immediate result that the double salt $CaSO_4,K_2SO_4,H_2O$ is decomposed. The decomposition, with decreasing $K_2O$ concentration in the solution, proceeds along either one of two routes, depending upon the prevailing temperature. Above 30 to 35° C., and concentration between 2 and 3% $K_2O$, the break-down of the double salt first results in the formation of another double salt (potassium pentacalcium sulfate) containing only one-fifth as much $K_2SO_4$ as the primary double salt, and of an entirely different physical character and less objectionable in the filtering operation than the mono-calcium double salt. On further dilution, such as would be encountered in washing the filter cake, or in washing the solids by the principle of countercurrent flow, the potassium pentacalcium sulfate becomes unstable when the concentration, at slightly over 30°, is approximately 2% and at 70°, approximately ½% $K_2O$. This decomposition of the potassium pentacalcium sulfate results in the precipitating out of gypsum or of anhydrite salt, while the entire potassium content is returned to the solution as a simple soluble compound $K_2SO_4$. Below approximately 30° C., the decomposition of the double salt results directly in formation of insoluble gypsum and soluble $K_2SO_4$, the $CaSO_4.2H_2O$ becoming a constituent of the solids in the sludge and the $K_2SO_4$ returning to the solution in dissolved condition. The breaking up of the double salt and re-solution of the $K_2SO_4$ by either of these routes requires an appreciable time, as the operation is a surface reaction, and the agitation of the sludge with additional water is continued for sufficient time to insure completion of such re-solution. The sludge is then passed to filter 11, wherein the insolubles are removed at 12 and the solution at 14. Said solution, being dilute, is preferably returned to the leaching apparatus 1 by pump 15.

My invention is especially applicable in connection with the process of potassium compound recovery from cement kiln flue dust, disclosed in the application of Harry V. Welch, filed August 11, 1917, No. 185,779, such process being carried out in an electrical precipitator, the collecting electrode of which is a continuously moving sheet or film of water, or of solution supplied by suitable water supply means at the treater top, as indicated at 16 in Fig. 1, this moving electrode sheet or film being maintained and the potassium compound content controlled within certain limits by utilizing a closed moving liquid circuit from the discharge at bottom of the collecting electrodes to the top and feed of the collecting electrodes. For the separation of essentially the inert solid constituents of the collected flue dust, the thickener device 5 (or a filter means), is introduced in this closed circuit, the main part of the overflow from this thickener to sump 19 being returned by piping 21 and pump 15, to the liquid supply means at the top of the precipitator. The operation is such as to remove at each cycle, after the desired potassium compound concentration had been reached, a certain fraction of the solution through the pipe 6, and remove substantially all the solids through outlet 7, while returning a substantially clear overflow or filtrate to the treater heads through connection 21. Since the volume of flow passing through the film electrode precipitator is governed by the amount of collecting electrode surface exposed, rather than by the dust to be collected, it has been found that the ratio of liquid to solids in the pulp leaving treaters, is much greater than is the case where leaching upon the already collected cement kiln dust is practised. In the latter case, for flue dusts free from chlorids, a ratio of 1 of dust to two to four of solvent, is practised, dependent, in particular, upon the available water soluble potassium compound in the flue dust and the limit of approximately 4% potassium compound in the solution calculated as $K_2O$, and in particular, upon the necessity of mechanical handling. In the case of leaching by precipitation with flowing liquid as described, the ratio of dust to liquids may reach 1 of solids to 50, and up to 100 of liquids. A portion then of the clear overflow from the thickener device is sent through outlet 6 to evaporators or to crystallizing tanks or pans, indicated at 17, while the thickened pulp discharge from the thickener device and running approximately 1 of solids to 1 to 2 of liquid, is passed to the agitator tank 8, where the dilution is brought up to 4 or 5 of liquid to 1 of solids, and the potassium compound concentration calculated as $K_2O$ lowered to 3% or lower for 80°, and 2% or lower for 30°, under which conditions, the double salt $CaSO_4,K_2SO_4,H_2O$, is completely decomposed, and the solution of potassium compound is then filtered from the insoluble material, as above described, and returned to the precipitator and leaching apparatus 1, through piping 2 by pump 15.

Figure 2:
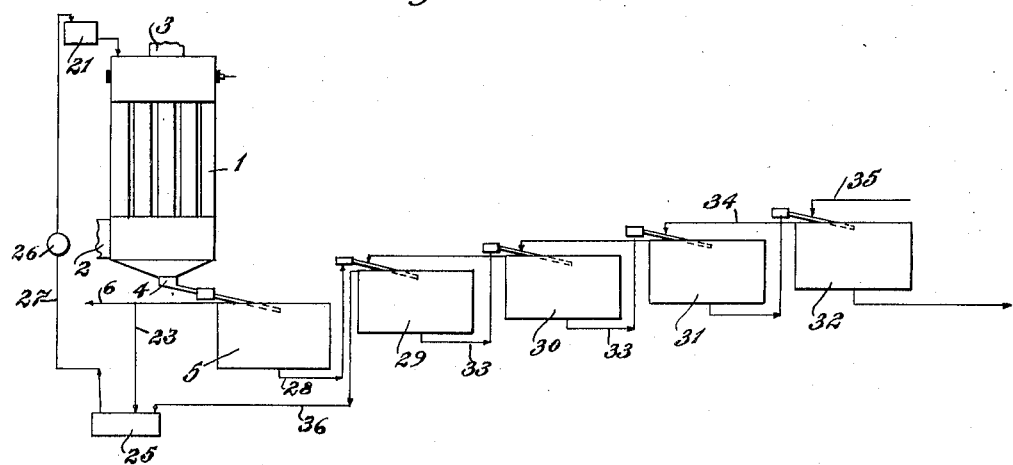
Fig. 2 is a flow sheet of an apparatus adapted to dispense with filtration and employing only counter-current washing.

My invention may also be carried out in the apparatus shown in Fig. 2, wherein the leaching means 1, preferably an electrical precipitator such as above described, discharges through outlet 4 to a decantation or dewatering tank 5, preferably formed as a thickener, the overflow from this thickener passing by connection 6 to evaporator or crystallizer and by connection 23 to a sump 25, from which it is pumped through pipe 27 by pump 26 back to the supply means 21 for the leaching apparatus. The sludge from the thickener 5 is passed by suitable conveying means 28 to the first of a series of thickeners or washing and dilution tanks 29, 30, 31 and 32, each of which has its sludge outlet 33 connected to discharge into the following thickener, and each of which has its overflow outlet 34 for clear liquid, connected to discharge into the sludge intake of the preceding thickener so as to wash the sludge by counter-current action, the wash water being supplied to the last thickener of the series by connection 35 and the overflow from the first thickener of the series passing by outlet 36 to the sump 25.

In carrying out the process in this apparatus, the concentrated solution decanted or overflowing from thickener 5 passes partly through connection 23 to a sump 25 and is partly drawn off by a bleeding connection 6 from the overflow of the said thickener, the portion of concentrated solution so bled off being treated by cooling or by evaporation for recovery of the potassium salt therefrom. The sludge from the thickener 5 passes through connection 28 to the thickener 29 where it is diluted sufficiently by dilute solution coming through inlet connection 34 to reduce the concentration of potassium sulfate in the solution to a point sufficiently low to break up double sulfate of potassium and calcium that may have been formed and bring substantially all of the potassium sulfate into solution. The effect of the series of succeeding thickeners 30, etc., is to wash the remaining insolubles thoroughly and carry all of the solubles into and through the first thickener 29, and out at the overflow 36, which delivers the same to the sump 25 from which the leaching apparatus is supplied. Thickeners 29, etc., which in this case serve as mixing and washing means, may be of any suitable type, such as Dorr thickeners, and may be of any desired number, preferably at least three, so as to provide for effective counter-current washing. The breaking up of the insoluble double salt is effected mainly in the first thickener or dilution tank 29, but the following thickeners 30, 31, etc., may also serve to break up further quantities of the double salt, and to dissolve the contained potassium sulfate. For example, the dilution in tank 29 may serve for breaking up $CaSO_4,K_2SO_4,H_2O$ forming potassium sulfate, which dissolves, and the pentasulfate which is relatively insoluble, but is decomposed in further dilution in the succeeding tanks 30, etc. Moreover, since the breaking up of the double salts referred to requires an appreciable time, it may not be completed until the material has had time to travel through several of these tanks.

What I claim is:

1. The process of recovering potassium compound from solid material containing potassium, calcium and the sulfate radical, which consists in treating such material with water, in such manner as to produce a solution containing potassium sulfate and calcium sulfate in such concentration that a relatively insoluble double sulfate of potassium and calcium is also produced, then separating such concentrated solution from the insoluble material and adding to said insoluble material enough water to reduce the potassium sulfate concentration of the mixture sufficiently to decompose said double salt and bring a further quantity of potassium sulfate into solution, and treating the resulting dilute solution, to recover the potassium compound therefrom.

2. The process of recovering potassium compound from solid material containing potassium, calcium and the sulfate radical, which consists in treating such material with water, in such manner as to produce a solution containing potassium sulfate and calcium sulfate in such concentration as to also produce a relatively insoluble double sulfate of potassium and calcium, then separating said concentrated solution from the insoluble material and adding to said insoluble material enough water to reduce the potassium sulfate concentration of the mixture sufficiently to decompose said double salt and bring a further quantity of potassium sulfate into solution and utilizing the resulting dilute solution in treating a further quantity of the solid material.

3. The process of recovering potassium compound from cement kiln dust containing potassium sulfate, which consists in subjecting such dust to the action of water at a temperature below 80° C., and in such manner as to produce a solution containing potassium sulfate and calcium sulfate in such concentration as to also result in the production of an insoluble double sulfate of potassium and calcium, recovering such concentrated solution from the sludge containing the insoluble material, treating said solution to obtain potassium sulfate, diluting said sludge sufficiently to decompose the double sulfate of potassium and calcium contained therein and to produce a dilute solution of potassium sulfate, and utilizing such dilute solution in treatment of a further quantity of dust.

4. The process of separating potassium compound from a mixture of solution and insoluble material at a temperature below 80° C., and containing potassium sulfate and calcium sulfate in such concentration as to cause the formation of a relatively insoluble double salt containing sulfates of potassium and calcium, which consists in first removing a portion of the solution from the mixture, and diluting the residual mixture sufficiently to decompose such relatively insoluble double salt, and produce a dilute solution of potassium sulfate.

5. The process of obtaining potassium sulfate solution from solid material containing potassium calcium and sulfate radical, which consists in treating such material with water in such manner as to produce a solution containing potassium sulfate and calcium sulfate in such concentration as to also produce a relatively insoluble double sulfate of potassium and calcium, then separating such concentrated solution from the insoluble material, and subjecting the remaining solid material to the action of water under such conditions of dilution of potassium salt, and for a sufficient time, to decompose such double sulfate and bring a further quantity of potassium sulfate into solution.

6. A process of leaching flue dust from cement manufacture, containing potassium compounds, a part of which are in a relatively insoluble condition, which comprises subjecting such flue dust to systematic extraction in a series of successively more and more dilute aqueous solutions, at least some of which are hot, and maintaining contact of the said flue dust and aqueous solvent until hydrolysis of a considerable part of the relatively insoluble potassium compounds is effected, whereby the relatively insoluble potassium compounds are, in part at least, rendered soluble and dissolved in the said solvent.

In testimony whereof I have hereunto subscribed my name this 23rd day of November, 1917.

RAYMOND B. STRINGFIELD.